United States Patent

[11] 3,552,301

| [72] | Inventor | George A. McNeff |
| | | Dallas, Tex. |
| [21] | Appl. No. | 804,775 |
| [22] | Filed | Mar. 6, 1969 |
| [45] | Patented | Jan. 5, 1971 |
| [73] | Assignee | Interlake Steel Corporation |
| | | Chicago, Ill. |
| | | a corporation of New York |

[54] COOKING-GRILL CONSTRUCTION
6 Claims, 3 Drawing Figs.

[52] U.S. Cl. .................................................. 99/445,
99/446; 126/25
[51] Int. Cl. .................................................. A47j 37/07
[50] Field of Search .......................................... 99/445,
444, 446, 447, 443, 455, 423; 126/9, 11, 25, 30

[56] References Cited
UNITED STATES PATENTS

| 1,504,102 | 8/1924 | Davis | 99/445 |
| 2,816,538 | 12/1957 | Miller et al. | 126/25 |
| 2,985,097 | 5/1961 | Nevin et al. | 99/447 |
| 3,320,873 | 5/1967 | Nissen et al. | 99/423 |
| 3,369,481 | 2/1968 | Pappas | 99/445 |
| 3,443,510 | 5/1969 | Norton | 99/445 |

*Primary Examiner*—Walter A. Scheel
*Assistant Examiner*—Arthur O. Henderson
*Attorney*—William P. Porcelli ABSTRACT: A cooking grill of the outdoor type for use with solid or gaseous fuel having improved melted fat runoff means which includes channel-shaped troughs for catching the melted fat as it drips from the food being cooked. The troughs are sloped toward a sidewall of the grill provided with groove means to receive the melted fat from the ends of the troughs and to direct it centrally of the sidewall. The bottom wall of the grill is provided with a drain and all the bottom is sloped toward the drain so that melted fat received from the groove means pours out the drain.

PATENTED JAN 5 1971 3,552,301

Inventor
George A. McNeff.
By William P. Porcelli
Atty.

COOKING-GRILL CONSTRUCTION

This invention relates to the art of cooking grills and particularly to improved construction of an outdoor type barbecue grill employing either charcoal or gas as the fuel.

One of the prevalent problems with barbecue grills of the type mentioned is associated with "flareup" resulting when cooking meats of high fat content and large amounts of fat drip onto the flame or heated portions of the grill to ignite in the form of a high flame. This condition results in singed arms and other burns to the cook and also is objectionable because of the uncontrolled burning of the meats being grilled. Generally speaking, very fat meats, such as bacon, are ordinarily not cooked on such a grill because heavy "flareup" is almost guaranteed.

It is an object of this invention to provide an improved cooking grill construction which minimizes the possibility of "flareup" and provides excellent flare control even when cooking high fat content meat, such as bacon.

In order to accomplish this objective, a grill is provided with an upper grate on which the meat or food is supported having channel-shaped troughs therein sloping toward the rear wall of the grill where they direct melted grease as it drips from the meat to the rear wall. The rear wall is provided with sloped grooves which catch the fat from the channel-shaped troughs and immediately direct it centrally of the rear wall and to the bottom of the grill. The bottom of the grill is sloped toward a drain hole to permit the grease to be quickly drained from the grill.

It is another object of the invention to provide a grill of the type mentioned which is of relatively simple and economical construction whereby the sloped grooves in the rear wall of the grill are cast directly into the wall so that no separate attachments are required for this function.

Another object of the invention is to provide such a grill which lends itself to either the use of charcoal or other solid fuel or gas.

Other objects and advantages of the invention can be understood upon reference to the accompanying drawings, in which.

Figure 1:
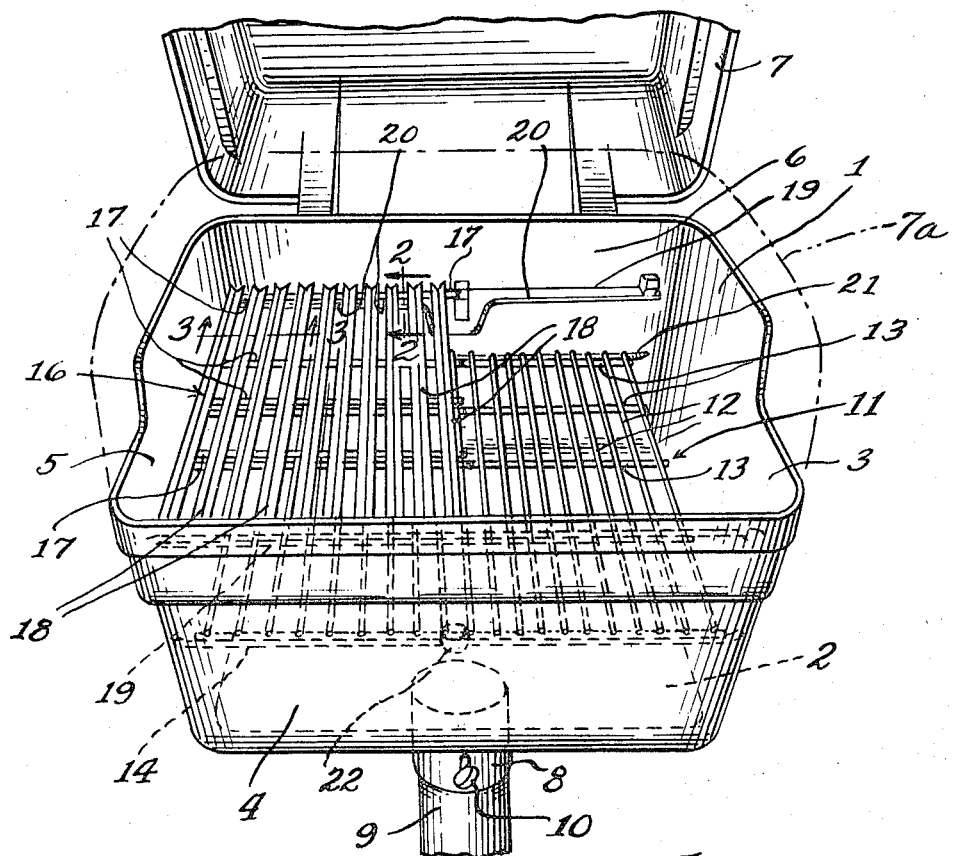
FIG. 1 shows a front perspective view as seen from above the grill of its portions embodying the invention described and claimed herein.
Figure 2:
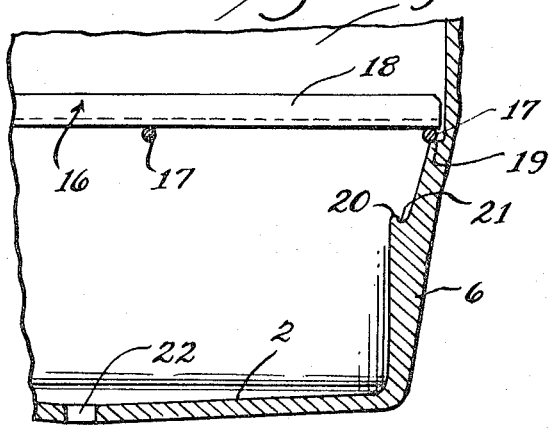
FIG. 2 shows a sectional view along the line 2—2 of FIG. 1 and particularly shows the arrangement of the fat runoff portions of the grill.

As shown in FIG. 1, the grill embodying the invention consists of a housing 1 provided with a bottom wall 2, four substantially vertical walls 3, 4, 5 and 6 and an open top. A cover 7 is mounted in a hinge arrangement (not shown) to the wall 6 and is pivoted from the position shown in solid outline in FIG. 1 to a closed position indicated by phantom outline at 7a.

The housing 1 is provided with a collar 8 extending downwardly from its bottom wall 2 which is telescoped over a supporting post 9 and held in position by a screw 10 passing through the collar 8 and bearing against the post 9.

Internally of the housing 1 is provided a grate 11 consisting of a plurality of rods 12 extending parallel to each other and spaced from each other and secured to other rods 13 spaced from each other and extending perpendicular to the rods 12. This grate 11 is held on ledges 14 and 15 positioned above the level of the bottom wall 2 of the housing 1. The grate 11 supports the solid fuel, such as charcoal, if the grill employs solid fuel; otherwise, the grate 11 may support lava briquets, or the like, which are heated to incandescence by gas supplied through the post 9 if the grill is to be heated by the use of gas as fuel.

Figure 3:
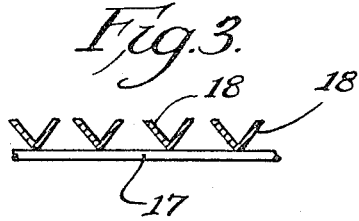
FIG. 3 shows a sectional view taken along the line 3—3 of FIG. 1.

Above the level of the grate 11 is the cooking grate 16 which is composed of spaced parallel rods 17 extending perpendicular to and secured to channel-shaped troughs 18 of V-shaped cross section as indicated in FIG. 3. This cooking grate 16 is supported on ledges 19 at both the front and rear walls 4 and 6 of the housing 1. The positions of the ledges 19 are such that the cooking grate 16 slopes slightly downward to the rear of the grill to permit the gravity flow of fat dripping onto the troughs 18.

As indicated in FIG. 1, the cooking grate 16 covers one-half of the cooking area of the grill. Although not shown, another such grate 16 is provided to cover the other half of the cooking area. Otherwise, a single cooking grate can be made large enough to cover the entire cooking area.

Provided in the rear wall 6 of the grill are two lips 20 which form grooves 21 behind them. These grooves 21 are sloped toward each other and toward the central region of the wall 6 and act as runoff guides for melted fat pouring from the ends of the troughs 18 of the cooking grates 16. The fat moves along the grooves 21 to a region between them where it pours down the wall 6 to the bottom wall 2 of the housing 1 which is sloped toward a drain hole 22 where the fat is finally drained from the grill.

Although the grill is shown with the cooking grate 16 sloped to the rear and the grooves 21 on the rear wall 6 of the housing 1, it should be understood that the grill can be arranged to direct the melted fat toward any of the other three walls of the grill in which the grooves 21 can be positioned. By having the fat running toward the rear of the grill, this provides the heaviest concentration of grease away from the location of the cook who ordinarily stands at the front of the grill. This minimizes the possibility of an intense flame near the cook.

The troughs 18 are shown as V-shaped. They can be of other channel shapes, such as semicircular or with vertical sides.

In operation, as meat is being cooked on the cooking grate 16, any fat that drips from the meat either drips between the troughs 18 directly to the to the bottom wall 2 of the grill or else falls into the troughs 18 and runs directly to the rear wall 6 of the grill where it is caught by the grooves 21 and directed centrally of the wall 6 where it runs down to the bottom wall 2 and out the drain 22. It has been found that with the approximate proportionaly spacing of the troughs 18 as shown, sufficient grease is collected by the troughs 18 and run off quickly enough that even bacon can be cooked on such a grill with little possibility of significant flareup.

Although only substantially a single embodiment of the invention has been shown and described, it should be clearly understood that the invention can be made in many different ways without departing from the true scope of the invention as defined by the appended claims in which:

I claim:

1. A cooking grill comprising, an open top receptacle, a cooking grate supported in the receptacle above the level of the bottom of the receptacle, means for heating the cooking grate and food placed thereon, the cooking grate having a plurality of spaced channel-shaped troughs which are positioned to receive melted fat from food cooking on the cooking grate, said troughs sloping downwardly toward one sidewall of the receptacle so that the melted fat caught in the troughs travels toward said sidewall by force of gravity, said sidewall being provided with groove means for receiving the melted fat from the troughs, the groove means being aligned for directing the melted fat to a confined path region down the sidewall to said bottom of the receptacle, said bottom being provided with a drain and being sloped so that melted fat reaching the bottom pours by gravity toward the drain.

2. A cooking grill as defined by claim 1 characterized by, the groove means being divided into two parts which slope downwardly toward each other and toward the central region of said sidewall.

3. A cooking grill as defined by claim 1 characterized by, said cooking grate being divided into two separate parts positioned side by side in the receptacle along a single horizontal plane.

4. A cooking grill as defined by claim 1 characterized by, said troughs extending parallel to each other and spaced from each other by approximately the width of each trough.

5. A cooking grill as defined by claim 1 characterized by, the groove means being divided into two parts which slope downwardly toward each other and toward the central region of said sidewall, said cooking grate being divided into two separate parts positioned side by side in the receptacle along a single horizontal plane, said troughs extending parallel to each other and spaced from each other by approximately the width of each trough.

6. A cooking grill as defined by claim 1 characterized by, the receptacle being cast in a single piece with the groove means being cast as part of the single piece.